United States Patent [19]
Wiater

[11] 3,841,188
[45] Oct. 15, 1974

[54] BENCH SAW
[76] Inventor: Joseph R. Wiater, 4933 N. Oconto, Harwood Heights, Ill. 60656
[22] Filed: Apr. 11, 1973
[21] Appl. No.: 350,060

[52] U.S. Cl.............. 83/471.3, 83/522, 83/468, 83/477.2, 83/455, 83/581
[51] Int. Cl............................................. B27b 5/18
[58] Field of Search............ 83/471.3, 471.2, 477.2, 83/477.1, 467, 468, 452, 455, 552, 581

[56] References Cited
UNITED STATES PATENTS
| | | | |
|---|---|---|---|
| 1,785,044 | 12/1930 | Nickels | 83/468 |
| 2,323,248 | 6/1943 | Sellmeyer | 83/471.3 |
| 3,344,819 | 10/1967 | Mitchell | 83/471.3 |

Primary Examiner—Donald R. Schran
Attorney, Agent, or Firm—Molinare, Allegretti, Newitt & Witcoff

[57] ABSTRACT

A bench or table saw includes an elongate slot extending across a substantial portion of the width of the table surface and a powered saw movably mounted beneath the table. The cutting blade of the saw projects upward through the slot and is movable along the slot for cutting the work to be cut, the latter of which is held stationary on the table surface. An adjustable work holder is attached to the table surface for adjusting the angle of the work to be cut relative to the elongate slot and the angle at which the cutting blade projects through the slot may be adjusted, whereby the work to be cut may be simple or compound mitered.

6 Claims, 2 Drawing Figures

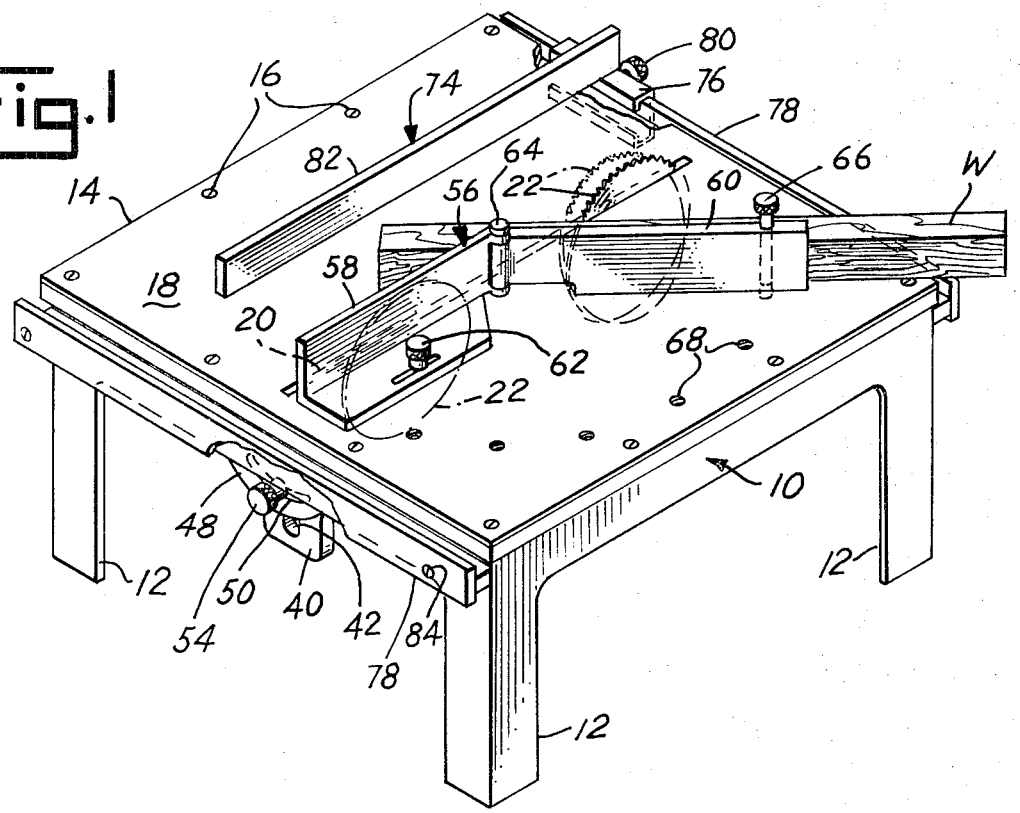
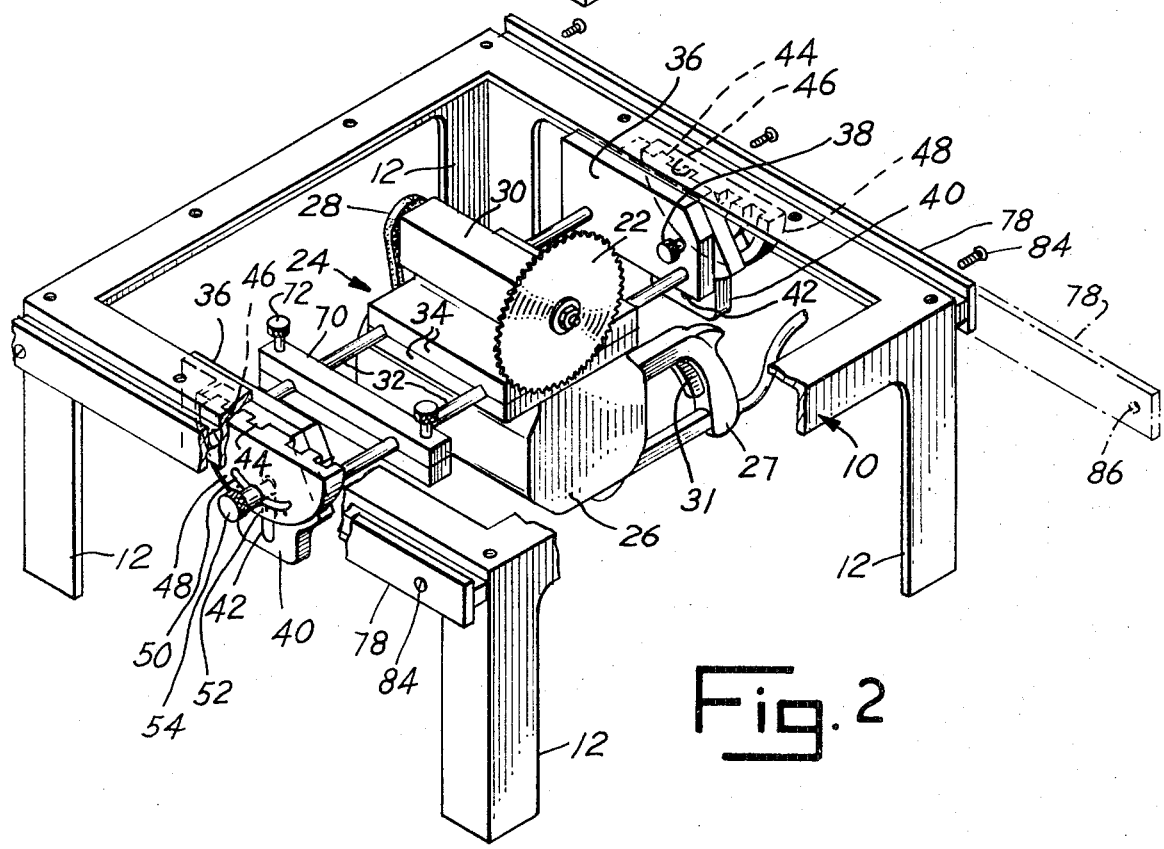

BENCH SAW

BACKGROUND AND SUMMARY OF THE INVENTION

This invention relates to a bench saw and, more particularly, to a bench or table saw capable of cutting compound miters.

The woodworking craftsman, at present, may select generally between one of three available circular blade power saw combinations: a conventional bench or table saw, a radial arm saw, or a hand held portable saw. Each of these saw combinations exhibits certain advantages over the others, but also suffers certain disadvantages.

In conventional table or bench saws, the saw drive mechanism is located beneath the table surface and a circular cutting blade projects upward through a short slot in the surface of the table. In use, the cutting blade is stationarily mounted and the work to be cut must be fed to the blade. Such table saws offer the advantage of safety, since the principal portion of the cutting blade is located beneath the work surface of the bench or table. Also the craftsman using the table or bench saw has a generally unobstructed view of the work as it is being cut. Moreover, such bench or table saws generally are capable of being adjusted to cut either simple or compound miters, since the blade angle and/or the work piece holder may be adjusted as desired. The height of the blade may also be adjusted for cutting through less than the thickness of the work to be cut. However, such bench or table saws suffer the disadvantage that the work to be cut must be moved into the cutting blade which is stationarily positioned on the table surface. This relative movement of work into the blade renders the cutting of substantially long lengths more difficult and subject to inaccuracy, since movement of such lengthy pieces as they are being fed into the saw blade is difficult to control.

In radial arm saws the cutting blade and drive train are suspended above the table on which the work is held by way of an overhead arbor and the entire saw assembly, drive train and all, is moved into engagement with the work which is to be cut, the work being held stationary. This construction overcomes the difficulties which are presented when feeding work of substantial lengths. However, a certain degree of accuracy of cut is sacrificed due to the overhead mounted blade and drive train frequently obscuring the view of the craftsman. Also safety is sacrificed, since the rotating cutting blade is positioned above the work surface during operation between the craftsman and the work. Moreover, such radial arm assemblies are generally quite cumbersome and are incapable of being produced in sizes and weights which are necessary to render the machine portable. Thus, such radial arm assemblies generally find application only in stationary installations.

Finally, portable hand saws, although being light and portable, also must be operated on top of the work which is to be cut and thereby obscure the view of the craftsman. Moreover, accuracy is sacrificed in such hand saws, and auxiliary rigs for use with such hand saws for the cutting of miters are inaccurate and cumbersome, at best.

The bench or table saw constructed in accordance with the principles of the present invention achieves the respective advantages of each of the abovenoted available combinations while overcoming the several disadvantages of these combinations. In the table saw of the present invention, a high degree of accuracy of cut is possible even where the work to be cut is of substantial length. In the table saw incorporating the principles of the present invention safety is optimized, since the drive train and the major portion of the cutting blade is positioned beneath the table surface and the craftsman has an unobstructed view of the work to be cut and the cutting blade. In the table saw incorporating the principles of the present invention, the work to be cut is held stationary by the craftsman and the cutting blade is fed into the work, thus achieving a high degree of accuracy and optimizing the handling of the work whatever its length. Moreover, the table saw incorporating the principles of the present invention may be easily and rapidly set up to cut simple, as well as compound miters, and may also be set up for ripping or cutting grooves or the like of predetermined depths less than the thickness of the work. Finally, the table saw incorporating the principles of the present invention is capable of being scaled to a size which readily adapts the saw for portability.

In a principal aspect of the present invention, a table saw includes a rigid planar table surface having an elongate slot which extends across a substantial portion of the width of the surface. Powered saw means, including a cutting blade, is mounted beneath the surface by mounting means such that the cutting blade projects upward through the slot and above the surface. The mounting means includes guide means for mounting and guiding the saw means for longitudinal movement along the length of the slot and a work holder is stationarily mounted to the surface for positioning the work to be cut in the path of movement of the cutting blade as the blade is moved along the slot.

In another principal aspect of the present invention, the above described table saw may be readily adjusted to cut either simple or compound miters on the work to be cut.

These and other objects, features and advantages of the present invention will be more clearly understood through a consideration of the following detailed description.

BRIEF DESCRIPTION OF THE DRAWING

In the course of this description, reference will frequently be made to the attached drawing in which:

FIG. 1 is a perspective view of a bench or table saw constructed in accordance with the principles of the present invention; and FIG. 2 is a perspective view of the saw shown in FIG. 1, but in which the work surface has been removed to expose the underlying mounting and saw assembly.

DESCRIPTION OF THE PREFERRED EMBODIMENT

The preferred embodiment of bench or table saw constructed in accordance with the principles of the present invention includes a rigid support frame 10 which is preferably square in cross section and which has four spaced downwardly depending legs 12 at opposite corners of the frame. As employed herein the terms "bench saw" and "table saw" are synonymous. A sturdy rigid planar plate 14 is firmly fixed to the top of the frame 10, as by screws 16, so as to define an upward facing planar work surface 18. An elongate slot 20 is cut in the work surface 18 over substantially the entire width of the surface as shown in FIG. 1 for projection upwardly therethrough and movement therein of a circular saw blade 22.

Referring particularly to FIG. 2, the saw blade 22 and its drive train are mounted beneath the surface 18 by way of a mounting assembly, generally 24. The saw assembly comprises a high speed motor 26 having a suitable handle 27. The motor is coupled by way of suitable drive belts and pulleys 28 to the cutting blade drive shaft 30 for driving the blade 22 and the motor 26 is preferably energized by way of a pushbutton control 31 in the handle 27.

The mounting assembly 24 also includes a pair of elongate spaced rods 32 which extend generally parallel to the slot 20. The rods 32 are received between a pair of plates 34 so that the saw assembly may be guided for movement and moved back and forth along the rods, with the rods 32 acting as guides.

The ends of the rods 32 are firmly fixed to support plates 36 as by welding or threading (not shown). In turn, plates 36 are mounted by way of a suitable thumb screw 38 or the like to downward depending plates 40 having a vertical slot 42 therein. By loosening the thumb screw 38, the saw assembly, rods 32 and plates 36 may be adjusted upward or downward to thereby adjust the height of the cutting blade 22. This adjustment is of particular advantage as where dados and grooves are to be cut in the work to a depth less than the thickness of the work.

The top of the outwardly facing surfaces of the plates 40 define a plurality of arcuate ridges 44 which are adapted to slidingly fit into a plurality of complementary arcuate grooves 46 in the surface of an arcuate blade angle adjusting plate 48. The adjusting plate 48 is stationarily mounted to the underside of the frame and the plates 48 include an arcuate slot 50, one of which may be indexed at 52 and which receives a thumb screw 54 for locking plates 40 and 48 together when the blade 22 has been positioned at its desired angle. Thereby, the blade 22, upon loosening the thumb screw 54, may be tilted about an axis parallel to the rods 32 or the slot 20 so as to tilt the blade to its desired angle, such as shown to the right in dot and dash in FIG. 1, for cutting a beveled miter on the work which is to be cut.

Referring again to FIG. 1, a mitering work holder 56 is mounted to the surface 18 of the table. The work holder comprises a pair of fence portions 58 and 60. Portion 58 is stationarily mounted to the table by way of thumb screw 62 such that its vertical surface lies parallel to the elongate slot 20. The second fence portion 60 is hingedly mounted to the end of the fence portion 58 such that it may be pivoted about pin 64 to vary the angle between the portion 60 and the slot 20. Thus, the fence portion 60 may be positioned at any one of several selected angles, whereby the miter angle of the work to be cut may be adjusted relative to the slot 20 and the path of movement of blade 22. Once the portion 60 has been moved to its desired angle, the fence portion 60 is also locked to the surface 18 by way of thumb screw 66 and threaded holes 68 in the table surface.

In the table saw of the present invention it is preferred that provision also be made to easily and rapidly convert the table saw to a conventional ripping configuration. This is accomplished simply by way of a locking clamp 70 which is slideable on rods 32 and which may be locked in place by thumb screws 72. Thus, when the saw assembly is moved to the right as viewed in FIG. 2 and the locking clamp 70 is brought into engagement with the left edge of plates 34 and locked, the saw blade will be held stationary and the work may be fed into this stationary saw as in the conventional table saw. The position of the blade 22 in this ripping configuration is shown in solid in FIG. 1.

When the table saw of the present invention is rigged in this ripping configuration, the adjustable mitering work holder 56 is removed and a conventional ripping fence 74 is provided. The ripping fence 74 comprises a C-shaped bracket 76 which fits over an elongate flat bar at the table edge 78 and which may be adjustably locked to the bar by a thumb screw 80. An elongate fence portion 82 is rigidly fastened to bracket 76 and extends in perpendicular relationship to the bracket and upon the surface 18 of the table. The spacing of the fence portion 82 relative to the cutting blade 22 may be accurately adjusted by moving the bracket 76 back and forth on bar 78. The elongate bars 78 are also preferably adjustable such that they may be extended from the support frame 10 as shown in dot and dash in FIG. 2 for supporting large panels during cutting, such as plywood panels. Bars 78 may be locked in place by screws 84 which are threaded through spaced holes 86 in the bars and into the support frame 10.

In rigging the table saw of the present invention, the blade 22 is first adjusted to the desired height by loosening thumb screws 38 and moving plates 36 vertically along slots 42 of plates 40. When the desired blade height is reached, the thumb screws 38 are tightened, locking the assembly 24 in height. Usually the desired blade height will be that at which the blade 22 projects the maximum height above surface 18. Blade height adjustment becomes critical generally only where less than the entire thickness of the work is to be cut through, e.g., a dado cut.

If it is desired to cut an edge bevel on the work, the angle of the cutting blade relative to the surface 18 may be readily adjusted by loosening thumb screw 54 and rotating the entire assembly about plate 48. Once the desired angle of the blade 22 is reached, the mounting assembly is again locked in place at the desired angle by tightening thumb screw 54. If the work is not to include an edge bevel, the blade is locked in perpendicular relationship to the surface 18.

Finally, the miter work holder 56 is attached to the surface 18 by thumb screw 62 and the portion 60 is adjusted about pin 64 to extend at the desired miter angle at which the work is to be cut. Once adjusted to its desired angle, portion 60 is locked in place by thumb screw 66.

The craftsman, by way of handle 27, now moves the saw assembly to the left as shown in dot and dash in FIG. 1. He then positions the work W to be cut firmly against the fence portion 60 as shown in FIG. 1 and, while holding the work stationarily against the fence, the craftsman energizes the saw by way of pushbutton 31 and draws the rotating saw blade 22 toward him and through the stationarily held work W. Thereby, depending upon the adjustment position of the fence 60 and/or the angle of adjustment of the cutting blade 22, one or more miters will be cut on the work W.

To rig the saw for ripping, the saw assembly is simply drawn to the right as viewed in FIG. 2 as far as it will move and is locked in place by locking clamp 70. Also the miter work holder 56 is removed and the rip fence 74 is positioned to guide the work as it is fed into the now fixed cutting blade 22 as shown in solid in FIG. 1.

It will be understood upon consideration of the above detailed description, that the table saw of the present invention readily lends itself to portability. The structural materials employed in the support frame 10, table plate 14 and the like are of sufficient rigidity and strength to provide a firm support during use of the table saw and, where the table saw is portable, these materials preferably are aluminum to minimize the weight of the unit.

It will also be understood that the embodiment of the present invention which has been described is merely illustrative of one of the applications of the principles of the invention. Numerous modifications may be made by those skilled in the art without departing from the true spirit and scope of the invention.

What is claimed is:

1. A table saw comprising:
   frame means,
   a planar rigid table surface mounted on said frame means, an elongate slot defined in said surface and extending across a substantial portion of the width of said surface,
   powered saw means including a cutting blade,
   mounting means mounting said saw means beneath said surface such that said cutting blade projects upward through said slot and above said surface, said mounting means including a pair of elongate spaced rods extending parallel to said slot beneath said surface, said saw means being longitudinally movable along said rods and the length of said slot relative to the work to be cut, a pair of first and second plate means each having complementary interfitting arcuate ridges and grooves in adjacent facing surfaces thereof, said first plate means of each said pair being stationarily mounted to said frame means adjacent opposite ends of said slot, said second plate means of each said pair being mounted to said first plate means by said interfitting arcuate ridges and grooves and supporting said elongate rods thereon, one of said ridges and grooves being selectively movable relative to the other to selectively vary the angle at which said cutting blade projects through said slot about an axis parallel to said slot, and
   work holder means stationarily mounted to said surface for positioning the work to be cut in the path of movement of said cutting blade as said blade is moved along said slot.

2. The table saw of claim 1 wherein said work holder means extends at a substantial angle to the path of movement of said cutting blade and includes means for selectively varying said angle such that the work to be cut may be selectively mitered.

3. The table saw of claim 2 wherein said work holder means includes first and second elongate fence portions, first fastening means for stationarily fastening said first fence portion to said surface and parallel to said slot, hinge means pivotally mounting said second fence portion to said first fence portion, said second fence portion extending at an angle to said first fence portion which may be selectively varied by pivoting said second fence portion about said hinge means, and second fastening means for fastening said second fence portion to said surface at at least one of the selected angles.

4. The table saw of claim 1 wherein said work holder means extends at a substantial angle to the path of movement of said cutting blade and includes first means for selectively varying said angle, whereby when the angle at which said cutting blade projects through said slot is also selectively varied, the work to be cut may be compound mitered.

5. The table saw of claim 1 wherein said mounting means includes locking means for locking said cutting blade adjacent one end of said slot.

6. The table saw of claim 1 including means for moving said saw means in elevation to adjust the distance by which said cutting blade projects from said slot above said surface.

* * * * *